(12) United States Patent
Geng et al.

(10) Patent No.: US 9,916,157 B2
(45) Date of Patent: Mar. 13, 2018

(54) WORKBOOK COMPOSER FOR APPLICATION DEVELOPMENT FRAMEWORK

(71) Applicant: Oracle International Corporation, Redwood Shores, CA (US)

(72) Inventors: Yixuan Geng, Redwood City, CA (US); Edmund Alexander Davis, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/304,393

(22) Filed: Jun. 13, 2014

(65) Prior Publication Data
US 2015/0089334 A1  Mar. 26, 2015

Related U.S. Application Data

(60) Provisional application No. 61/880,767, filed on Sep. 20, 2013, provisional application No. 61/909,205, filed on Nov. 26, 2013.

(51) Int. Cl.
*G06F 17/30* (2006.01)
*G06F 9/44* (2018.01)
*G06F 9/455* (2018.01)

(52) U.S. Cl.
CPC ............ *G06F 8/71* (2013.01); *G06F 9/45504* (2013.01); *G06F 17/30011* (2013.01)

(58) Field of Classification Search
CPC .. G06F 17/30017; G11B 27/034; G11B 27/34
See application file for complete search history.

(56) References Cited

U.S. PATENT DOCUMENTS 6,868,413 B1   3/2005   Grindrod et al.
7,698,647 B2   4/2010   Steeb, III et al.
(Continued)

FOREIGN PATENT DOCUMENTS

CN   105593844   5/2016
EP   3047394      7/2016
(Continued)

OTHER PUBLICATIONS

U.S. Appl. No. 14/304,356, Non-Final Office Action dated Jul. 11, 2016, 12 pages.
(Continued)

*Primary Examiner* — Stephen Hong
*Assistant Examiner* — Shahid Khan
(74) *Attorney, Agent, or Firm* — Kilpatrick Townsend & Stockton LLP

(57) ABSTRACT

In various embodiments, methods, systems, and non-transitory computer-readable media are disclosed that allow users to specify runtime customizations of documents developed using a desktop integration framework. Workbook metadata is a set of information that describes how a given workbook is integrated with a particular web application. When a workbook is being published, metadata may be written into a local cache in the published workbook as well as a workbook definition file. Metadata management may be handed by a metadata service allowing updates and customization of published workbooks independently of a local cache in the published workbook and the workbook definition file. A workbook composer enables users to customize the metadata and store the customizations using the metadata manager.

18 Claims, 12 Drawing Sheets

(56) References Cited

U.S. PATENT DOCUMENTS

| | | |
|---|---|---|
| 7,926,030 B1 | 4/2011 | Harmon |
| 8,131,736 B1 | 3/2012 | Chang et al. |
| 8,463,888 B1 | 6/2013 | Boyer et al. |
| 8,762,857 B2 | 6/2014 | Steeb, III et al. |
| 2002/0194388 A1* | 12/2002 | Boloker ............... G06Q 20/208 709/251 |
| 2003/0193521 A1 | 10/2003 | Chen et al. |
| 2003/0233631 A1 | 12/2003 | Curry et al. |
| 2005/0203931 A1 | 9/2005 | Pingree et al. |
| 2006/0010134 A1 | 1/2006 | Davis et al. |
| 2006/0036745 A1 | 2/2006 | Stienhans et al. |
| 2006/0253830 A1 | 11/2006 | Rajanala et al. |
| 2006/0288085 A1 | 12/2006 | Alam |
| 2006/0294139 A1* | 12/2006 | Taylor ................... G06F 17/241 |
| 2007/0201654 A1 | 8/2007 | Shenfield |
| 2008/0114758 A1* | 5/2008 | Rupp ................ G06F 17/30867 |
| 2008/0219638 A1* | 9/2008 | Haot ................ H04N 21/25866 386/250 |
| 2009/0205013 A1 | 8/2009 | Lowes |
| 2010/0023934 A1 | 1/2010 | Sheehan et al. |
| 2011/0087689 A1 | 4/2011 | Ziegler |
| 2011/0088011 A1* | 4/2011 | Ouali ....................... G06F 8/10 717/105 |
| 2011/0246444 A1 | 10/2011 | Jenkins et al. |
| 2012/0159145 A1* | 6/2012 | Cheong ..................... G06F 8/61 713/100 |
| 2015/0089475 A1 | 3/2015 | Geng et al. |

FOREIGN PATENT DOCUMENTS

| | | |
|---|---|---|
| JP | 2016533547 | 10/2016 |
| WO | 2009045094 | 4/2009 |
| WO | 2015041829 | 3/2015 |

OTHER PUBLICATIONS

International Application No. PCT/US2014/053138, International Preliminary Report on Patentability dated Mar. 31, 2016, 6 pages.
International Application No. PCT/US2014/053138, International Search Report and Written Opinion dated Nov. 28, 2014, 9 pages.
U.S. Appl. No. 14/304,356, Non-Final Office Action dated Dec. 14, 2016, 15 pages.
"Final Office Action" issued in U.S. Appl. No. 14/304,393, dated Jun. 13, 2017, 16 pages.
"Extended European Search Report" issued in EP14845741.9, dated Apr. 26, 2017, 8 pages.
"Notice of Allowance" issued in U.S. Appl. No. 14/304,356 dated Sep. 8, 2017, 13 pages.

* cited by examiner

WORKBOOK COMPOSER FOR APPLICATION DEVELOPMENT FRAMEWORK

CROSS-REFERENCES TO RELATED APPLICATIONS

This application claims priority the benefit of and priority to:

U.S. Provisional Application No. 61/880,767, filed Sep. 20, 2013, and entitled "Runtime Customization Infrastructure," and U.S. Provisional Application No. 61/909,205, filed Nov. 26, 2013, and entitled "Workbook Composer," the disclosures of which are incorporated by reference herein for all purposes.

BACKGROUND OF THE INVENTION

An application refers to a software program, which on execution performs specific desired tasks. In general, several applications are executed in a run-time environment containing one or more of operating systems, virtual machines (e.g., supporting Java™ programming language), device drivers, etc., as is well known in the relevant arts.

Developers often use Application Development Frameworks (ADFs) (which are by themselves applications) for implementing/developing desired applications. An ADF provides a set of pre-defined code/data modules that can be directly/indirectly used in the development of an application. An ADF may also provide tools such as an IDE (integrated development environment), code generators, debuggers, etc. which facilitates a developer in coding/implementing the desired logic of the application in a faster/simpler manner.

In general, an ADF simplifies development of applications by providing re-usable components and integrated development environments, which application developers can use to define user interfaces and application logic by, for example, selecting components to perform desired tasks and defining the appearance, behavior, and interactions of the selected components. Some ADFs are based on a model-view-controller design pattern that promotes loose coupling and easier application development and maintenance. Oracle Application Development Framework is one example of an ADF that utilizes this design pattern.

Oracle ADF includes libraries of standards-based Java Server Faces (JSF) components with built-in HTML5 and Ajax functionality. With these components, web deployed user interfaces can be developed with a level of functionality and interactivity previously reserved for thick-client applications. The components offer data interaction, data visualization, and encapsulated browser side operations in a set of easy to use components that makes rich client application development easier than ever. Oracle ADF further provides a data-binding framework that simplifies binding UI to business services through a simple drag and drop operations in the IDE. This is done while still keeping the independence of the business service from consuming interfaces. With the framework, the UI developer is insulated from the underlying implementation of the business service layer. This makes the process of building the UI truly decoupled from the implementation of the business service layer, better positioning the application for implementation in a service-oriented architecture.

Accordingly, what is desired is to solve problems relating to building application user interfaces using application development frameworks, some of which may be discussed herein. Additionally, what is desired is to reduce drawbacks relating to building user interfaces using application development frameworks, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, methods, systems, and non-transitory computer-readable media are disclosed that allow end users to provide runtime customizations of documents developed using a desktop integration framework. Workbook metadata is a set of information that describes how a given workbook is integrated with a particular web application. When a workbook is being published, metadata may be written into a local cache in the published workbook as well as a workbook definition file. Metadata management may be handed by a metadata service allowing updates and customization of published workbooks independently of a local cache in the published workbook and the workbook definition file. A workbook customization editor is used to perform various customizations of integrated workbooks.

In various embodiments, a method includes receiving information identifying an integrated document. Metadata associated with the integrated document is received. A user interface is generated having functionality that enables users of the user interface to customize the metadata. Customized metadata provided via the user interface is stored in a storage device associated with the one or more computer systems such that a request to render the integrated document using the metadata incorporates the customized metadata.

Generating the user interface having functionality that enables users of the user interface to customize the metadata can include generating functionality that enables the users of the user interface to customize one or more components of a published document. Generating the user interface having functionality that enables users of the user interface to customize the metadata can include generating functionality that enables the users of the user interface to add one or more components to a published document. Generating the user interface having functionality that enables users of the user interface to customize the metadata can include generating functionality that enables the users of the user interface to remove one or more components from a published document. Generating the user interface having functionality that enables users of the user interface to customize the metadata can include generating functionality that enables the users of the user interface to customize contents of a published document. Generating the user interface having functionality that enables users of the user interface to customize the metadata can include generating functionality that enables the users of the user interface to customize one or more properties of a published document.

In one embodiment, a non-transitory computer-readable medium is provided storing computer-executable code. The non-transitory computer-readable medium includes code for receiving information identifying an integrated document, code for receiving metadata associated with the integrated document, code for generating a user interface having functionality that enables users of the user interface to customize the metadata, and code for storing customized metadata provided via the user interface such that a request to render the integrated document using the metadata incorporates the customized metadata.

In one embodiment, a system is provided that includes a processor and a memory configured to store a set of instructions which when execute by the processor configure the processor to receive information identifying an integrated document, receive metadata associated with the integrated document, generate a user interface having functionality that enables users of the user interface to customize the metadata, and store customized metadata provided via the user interface such that a request to render the integrated document using the metadata incorporates the customized metadata.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

Figure 1:
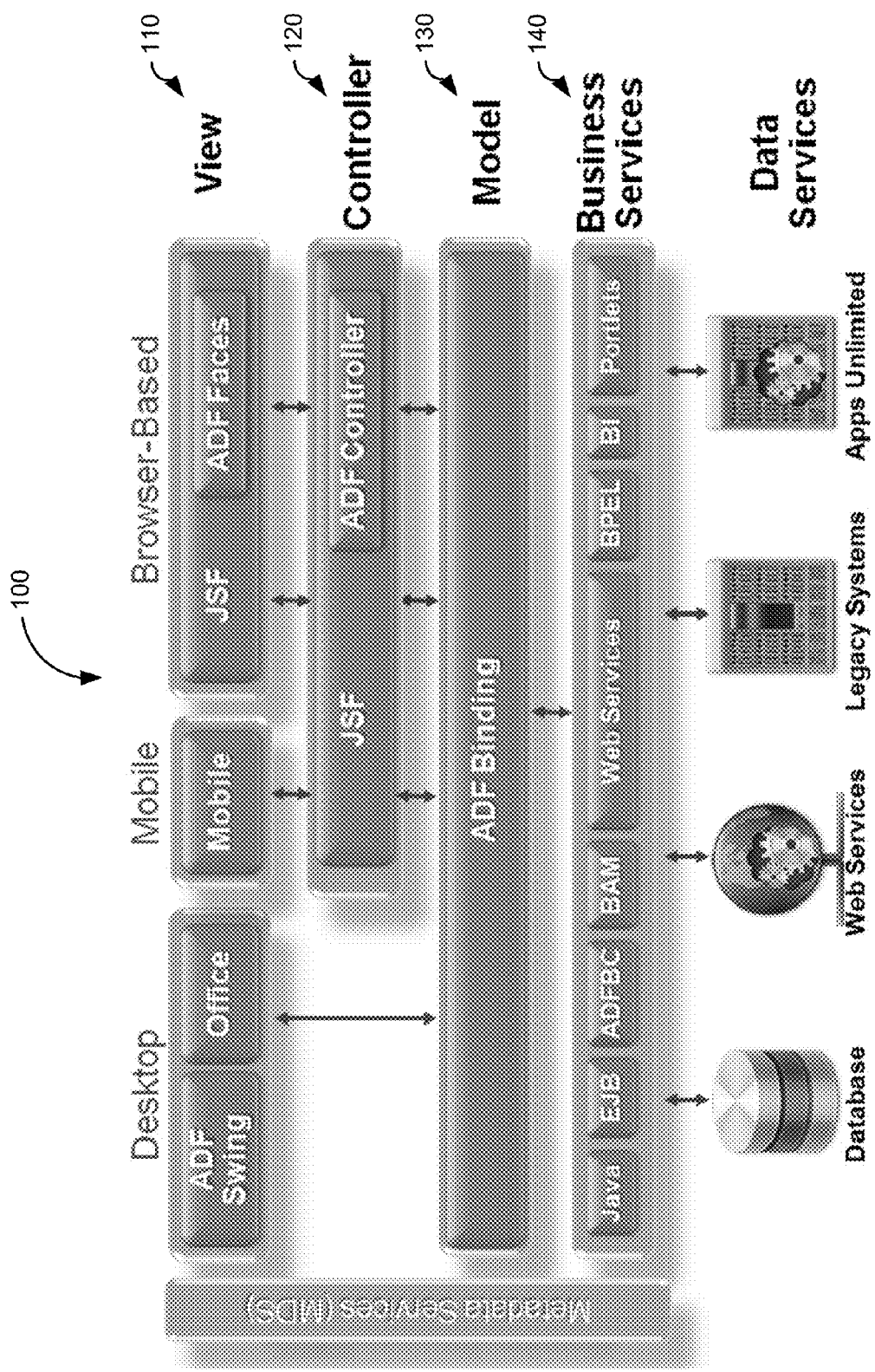
FIG. 1 is a block diagram illustrating an application development framework (ADF) in one embodiment according to the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Introduction

Java EE is a standard, robust, scalable, and secure platform that forms the basis for many of today's enterprise applications. Java EE provides a set of specifications for building multi-tier applications using the Java language. In the past, there was a direct correlation between the robust nature of an application to the complexity required to achieve it. However, with the advent of ADFs, such as Oracle ADF, the implementation of extremely rich Java EE applications can be provided by adhering to standard patterns and practices with greatly reduced effort.

With the increased need for organizations to build composite applications that utilize Service Oriented Architecture (SOA) principles, developers are forced to create applications that are extremely agile. Implementing these best practices in agile applications usually involves writing a significant amount of infrastructure code, adding another obstacle for developers building their first Java EE application. In addition to providing robust, performant, and maintainable applications—Oracle ADF provides the infrastructure code to implement agile SOA based applications thereby removing the effort involved in an organization "rolling their own."

Oracle ADF further provides a visual and declarative approach to Java EE development through the Oracle JDeveloper 11g development tool. Oracle ADF implements the Model-View-Controller design pattern and offers an integrated solution that covers all the layers of this architecture with solution to such areas as Object/Relational mapping, data persistence, reusable controller layer, rich Web user interface framework, data binding to UI, security and customization. Extending beyond the core Web based MVC approach, ADF also integrates with the Oracle SOA and WebCenter Portal frameworks simplifying the creation of complete composite applications.

For example, Oracle ADF makes it easy to develop agile applications that expose data as services by coupling a service interface to the built-in business services in ADF. This separation of business service implementation details is performed in Oracle ADF via metadata. Use of this metadata-driven architecture enables application developers to focus on the business logic and user experience, rather than the details of how services are accessed.

Oracle ADF stores the implementation details of these services in metadata in the ADF Model layer. This enables developers to exchange services without modifying the user interface, making the application extremely agile. Additionally, the developer creating the user interface does not need to bother with business service access details. Instead, developers can focus on developing the application interface and interaction logic. Creating the user experience can be as simple as dragging-and-dropping the desired business services onto a visual page designer and indicating what type of component should represent that data.

FIG. 1 is a block diagram illustrating application development framework (ADF) 100 in one embodiment according to the present invention. FIG. 1 is a simplified illustration of a system that may incorporate various embodiments or implementations of the one or more inventions presented within this disclosure. FIG. 1 may merely be illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

ADF 100 may be embodied as Oracle ADF is one example. Accordingly, ADF 100 is based on a Model-View-Controller (MVC) design pattern. An MVC application is separated into: 1) a model layer that handles interaction with data-sources and runs the business logic, 12) a view layer that handles the application user interface, and 3) a controller that manages the application flow and acts as the interface between the Model and the View layers. Separating applications into these three layers simplifies maintenance and reuse of components across applications. The independence of each layer from the others results in a loosely coupled, Service Oriented Architecture (SOA).

In this embodiment, modules forming an enterprise application are shown as being within ADF 100 to represent that the modules are developed using ADF and then executed within the context of ADF 100. For conciseness, the various internal details of ADF are not shown assuming that the application is developed using the JAVA programming language and Oracle ADF available as part of JDeveloper 10.1.3, a development tool available from Oracle Corporation. However, the features of the present invention described below may be implemented using any desired combination of programming language and application development framework as will be apparent to one skilled in the relevant arts by reading the disclosure provided herein.

In various embodiments, ADF 100 an application to be developed in the form of multiple layers, each layer containing code modules/files implementing desired logic according to pre-defined specification. Thus, in one embodiment, ADF 100 enables the application to be developed as four layers: view layer 110 containing code modules/files that provide the user interface of the application, controller layer 120 containing code modules that control the flow of the application, model layer 130 containing data/code modules that provide an abstraction layer for the underlying data, and business services layer 140 containing code modules that provide access to data from various sources and handles business logic.

Oracle ADF lets developers choose the technology they prefer to use when implementing each of the layers. FIG. 1 shows various options available for developers when building Oracle ADF applications. The glue that integrates the various components of Java EE applications and makes development so flexible is the Oracle ADF model layer. EJB, Web Services, JavaBeans, JPA/EclipseLink/TopLink objects, and many others can all be used as Business Services for the Oracle ADF Model. View layers can include Web based interfaces implemented with JSF, Desktop Swing applications and MS Office front ends, as well as interfaces for mobile devices.

It may be appreciated that the development of the application using such a layered approach often simplifies maintenance and reuse of components/code modules across various applications. Further, the independence of each layer from the other layers results in a loosely coupled service oriented architecture (SOA), which may be desirable when deploying the developed business/enterprise application on multiple/different systems.

In one aspect, view layer 110 represents the user interface of the application being developed. View layer 110 is shown with desktop, mobile, and browser-based views, each of which provides all or a portion of the user interface and is accessible in a variety of manners corresponding to view type. For example, web pages may be sent by the application in response to receiving client requests containing corresponding URLs. The web pages may then be displayed by a browser on a display unit (not shown) associated with a requesting client system, thereby enabling users of the requesting client system to interact with the enterprise application. Oracle ADF support multi-channel access to business services allowing reuse of business services and access from a Web client, a client-server swing desktop-based application, Microsoft Excel spreadsheets, mobile devices such as a smart-phone, or the like.

The code files/modules forming the view layer (such as web pages) may be implemented using one or more of hypertext markup language (HTML), Java server pages (JSP), and Java Server Faces (JSF). Alternatively, the user interface may be implemented using Java components such as Swing, and/or extensible markup language (XML). As further noted, the user interface may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADF 100. Some of the pre-defined modules may be used during development, for example, as templates for developing the web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

Controller layer 120 contains code modules/files that control the flow of the application. Each controller object contains software instructions and/or data implemented according to a desired manner of presenting information in view layer 110. The desired manner may include the specific web pages to be displayed when links in another web page are clicked/selected by the user, the page to be displayed when errors occur during execution, indicating the specific data to be stored/retrieved, etc.

In one aspect, controller layer 120 manages the applications flow and handles user input. For example, when a Search button is clicked on a page, the controller determines what action to perform (do a search) and where to navigate to (the results page). There are two controller options for web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming controller layer 120 are often implemented as Java servlets receiving the client requests and sending desired web pages as corresponding responses. Controller objects may also be implemented, for example, as Apache Jakarta Struts controllers or according to the JSF standard.

Model layer 130 contains data/code modules that connect various business services to the objects that use them in the other layers, such as to the controller objects discussed above or directly to desktop applications as shown. Each abstract data objects of model layer 130 provides a corresponding interface that can be used to access any type of business service, executing in underlying business service layer 140. The data objects may abstract the business service implementation details of a service from a client and/or expose data control methods/attributes to view components, providing a separation of the view and data layers.

In one aspect, model layer 130 consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

Oracle ADF emphasizes the use of the declarative programming paradigm throughout the development process to allow users to focus on the logic of application creation without having to get into implementation details. At a high level, the development process for a Fusion web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using an UML modeler, use cases can then be created for the application. Application control and navigation can also be designed. Diagrammers can used to visually determine the flow of application control and navigation. An underlying XML describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, business services layer 140 manages interaction with a data persistence layer. It provides such services as data persistence, object/relational mapping, transaction management, and business logic execution. The Business Services layer in Oracle ADF can be implemented in any of the following options: As simple Java classes, EJB, Web services, JPA objects, and Oracle ADF Business Components. In addition, data can be consumed directly from files (XML or CSV) as well as REST.

Thus, each business service manages interaction with a corresponding data persistence layer, and also provides such services as object/relational mapping, transaction management, business logic execution, etc. The business services layer may be implemented using one or more of simple Java classes, Enterprise Java Beans, web services, etc.

Business components represent a business service implemented using, for example, Oracle ADF Business Components, to provide interaction with databases, web services, legacy systems, application servers, and the like. In one embodiment, business components of business services layer 140 contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Desktop Integration

ADF Desktop Integration extends the Oracle Application Development Framework into the world of desktop applications like Microsoft Excel. Application developers can rapidly develop integrated documents, such as spreadsheets and documents of other desktop-based applications, to allow users to access and edit critical business data. This framework integrates seamlessly with each web application's security and business logic infrastructure. It also allows end users to edit their data without a live connection to the network. Once reconnected, ADF Desktop Integration can transparently upload and validate all user changes against the application's backend. Thus, ADF Desktop Integration allows developers to extend functionality provided by web-based applications to desktop applications. End users may also prefer ADF Desktop Integration because it provides a familiar user interface in the user's preferred desktop application to undertake information management tasks, such as performing complex calculations or uploading a large amount of data, easily and seamlessly.

Figure 2:
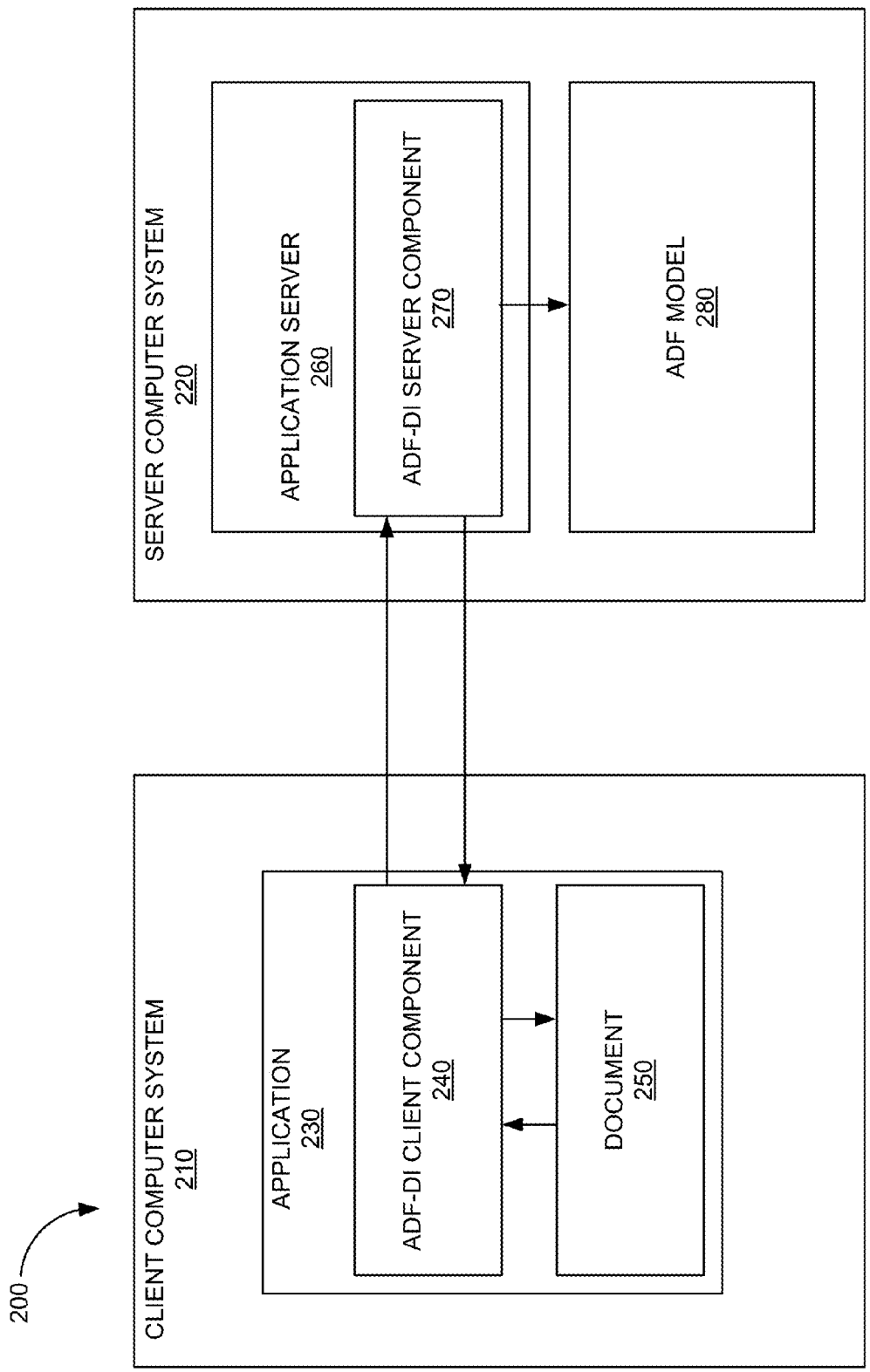
FIG. 2 is a block diagram illustrating a desktop integration framework for ADF of FIG. 1 in one embodiment according to the present invention.

FIG. 2 is a block diagram illustrating desktop integration framework 200 for ADF 100 of FIG. 1 in one embodiment according to the present invention. Desktop integration framework 200 may incorporate various embodiments or implementations of the one or more inventions presented within this disclosure. Desktop integration framework 200 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

In this example, desktop integration framework 200 includes client computer system 210 and server computer system 220. Client computer system 210 is representative of hardware and/or software elements configured to provide access to and/or host application 230. Client computer system 210 may be embodied as a personal computer system, a laptop, a tablet, a mobile device, and the like. Client computer system 210 may include one or more operating systems, applications, browsers, and the like executing on one or more computers. Client computer system 210 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

Application 230 is representative of one or more software elements that allow users to generate, edit, or otherwise interact with documents. Some examples of application 230 are text editors, word processing applications, spreadsheet applications, image editing and manipulation programs, and the like. In various embodiments, desktop integration framework 200 operates with configurations specific to desktop applications, such as Microsoft Office products like Microsoft Word and Microsoft Excel.

Application 230 further includes or is otherwise in communication with ADF-DI client component 240 and creates document 250. ADF-DI client component 240 is representative of one or more software elements that extend the functionality provided by web-based or other network-accessible applications to application 230. For example, ADF-DI client component 240 allows end users to avail themselves of a familiar user interface associated with application 230 to undertake information management tasks using document 250 that are normally performed by accessing server computer system 220. These tasks may be performed by or handled by web-based or other network-accessible applications hosted by server computer system 220. In various embodiments, data manipulated by such information management tasks performed in application 230 is synchronized with server computer system 220.

Document 250 is representative of one or more computer data files or units of electronic information. Document 250 may include text, images, audio, video, and other multimedia information. Document 250 may further be associated with metadata specific to application 230. Document 250 (or application 230) may provide native functionality for creating, interacting, and managing content associated with document 250. In various aspects, application 230 provides one or more interfaces for interacting with functionality of application 230 or content of document 250.

Server computer system 220 is representative of hardware and/or software elements configured to provide access to and/or host application server 260. Server computer system 220 may be embodied as local server computer system, a cloud service, and the like. Server computer system 220 may include one or more operating systems, servers, services, applications, and the like executing on one or more computers. Server computer system 220 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

Application server 260 is representative of one or more software elements that allow users to interact with web-based or network-based applications. Some examples of application server 260 are either a software framework that provides a generalized approach to creating an application-server implementation, without regard to what the application functions are, or the server portion of a specific implementation instance. In various embodiments, application server 260 operates with configurations specific to Java Platform, Enterprise Edition, or Java EE that defines a core set of API and features of Java Application Servers. Application server 260 may include servlets, and JavaServer Pages, Enterprise JavaBeans, and the like. Application server 260 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

ADF-DI server component 270 is representative of one or more server components, such as part of application server 260. In general, ADF-DI client component 240 acts as both view layer 110 and controller layer 120 and communicates with ADF-DI server component 270 acting in part as model layer 130 to synchronize data and execute business logic in applications hosted by application server 260 or in communication with application server 260 using ADF model 280. As discussed above, model layer 130 represents the data values related to a current view presented by ADF-DI client component 240 within application 230, along with model-level business rules, security, and application logic used against the data values. In this example, ADF-DI client component 240 and ADF-DI server component 270 allows end users to avail themselves of a familiar user interface associated with application 230 to undertake View/Controller tasks using document 250 to access ADF model 280.

In one aspect, a developer utilizes ADF-DI client component 240 to work within application 230 to create document 250 in a design mode. The developer structures and formats document 250 in a desired manner utilizing native tools of application 230. The developer then can add components to document 250 using ADF-DI client component 240 to integrate document 250 with application server 260. Some examples of components are input components (e.g., form components), output components, labels, lists, buttons, images, tables, and the like.

Components that are added to document 250 are then mapped to corresponding models provided by or through ADF-DI server component 270. For example, a text box component may e mapped to provide an input/output mechanism within document 250 to the name attribute of a person model provided by or through ADF-DI server component 270 exposed by model layer 130.

In one aspect, a component is a reusable entity providing functionality that can be used by many applications (or that can be used multiple times by the same application). Components can be embedded within document 250 and they can have zero or more visual representations. A component having no visual representations is not displayed but may provide some other functionality. A component generally provides one or more interfaces, such as a programming interface, a data-binding interface, and a visual interface. A component 200 may have one or more visual representations. As described further below, a component can have a visual representation driven by an underlying model.

In one aspect, a component can specify any number of views at design time, any of which can be displayed at runtime. A view assembly is the set of views that are actually displayed at runtime. The view assembly, for an application or a component, consists of views in the view composition that is selected for display at a certain point in time.

Once all desired components are included and mapped to data and/or model metadata accessible to application server 260 and ADF model 280, document 250 can be "published" or otherwise made available on application server 260.

Application server 260 may provide a download link to published documents enabling users to access the documents via a browser and begin working within application 230 to view, create, and/or manipulate data, such as that stored in a database accessible to server computer system 220. In various embodiments, published documents are stored separately from the document metadata that defines components, data mappings, and any logic a developer associated with a document. In some embodiments, a published document includes all document metadata.

Figure 3:
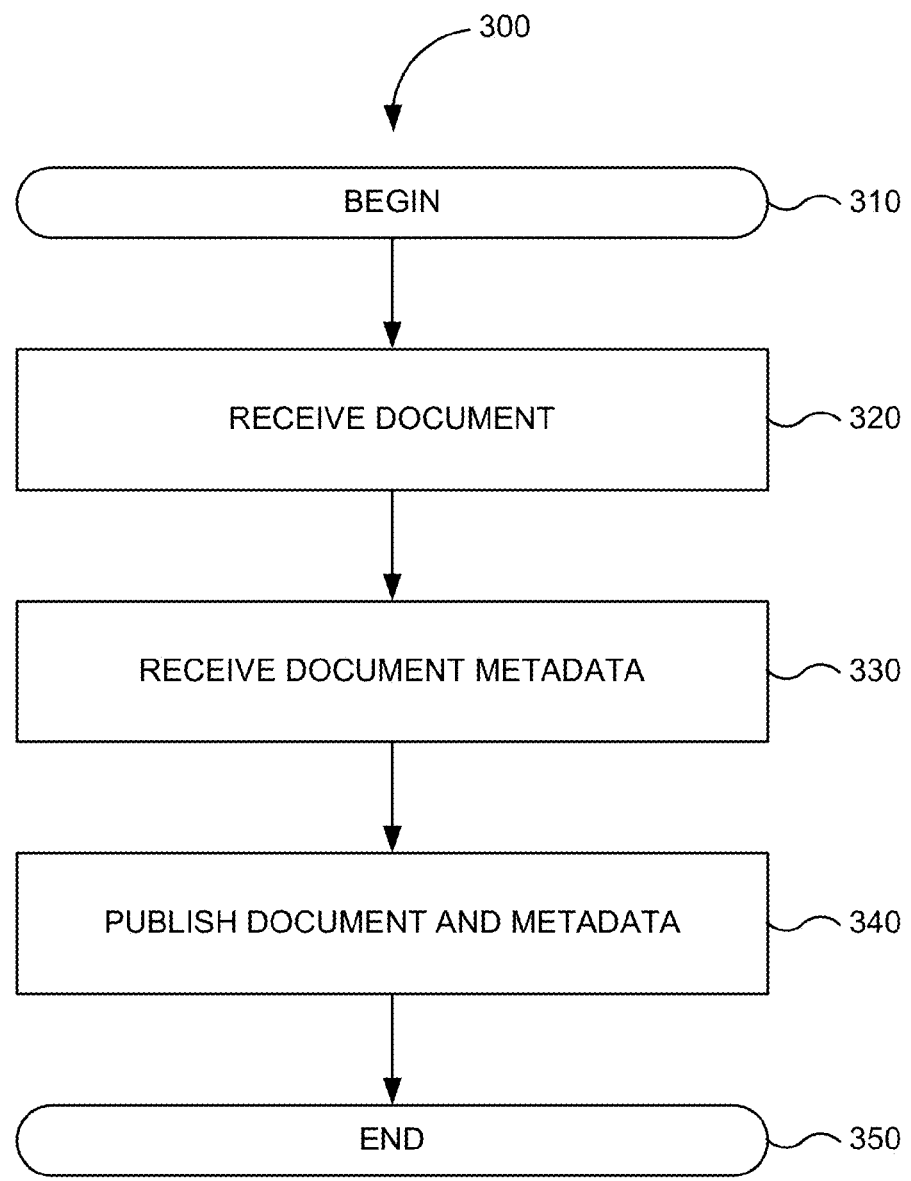
FIG. 3 is a flowchart of a method for designing a document using the desktop integration framework of FIG. 2 in one embodiment according to the present invention.

FIG. 3 is a flowchart of method 300 for designing a document using desktop integration framework 200 of FIG. 2 in one embodiment according to the present invention. Implementations or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, a document is received. In general, the document is created by an application that natively creates such documents or using a library that creates the document in a native format. According to FIG. 2, a user can open an existing document or create a new document in application 230, such as creating a new spreadsheet in Microsoft Excel. A document developer may edit, structure, or format the document in any desired manner using native and non-native tools.

In step 330, document metadata is received. The document metadata includes information utilized by ADF-DI client component 240 to render contents of the document based on data obtained from application server 260. In one aspect, the document metadata identifies each component included in the document and how a component is bound to data or metadata available in business services layer 140. Document metadata may further provide access information, static data, and other logic or data manipulation information provided by the developer. As discussed above, a developer may add components to document 250 using ADF-DI client component 240 to integrate document 250 with application server 260.

In various embodiments, ADF-DI client component 240 provides an expression builder that includes one or more properties for some or all components that may be added to a document. Each property may define an aspect of the behavior of its corresponding component. For example, a property may specify a model or object that is mapped to the component and/or one or more attributes of the model or object corresponding to the component. In another example, a property may specify aspects of document 250 such as table column headers, worksheet ribbon commands, and the like.

In step 340, the document and the document metadata are published. As discussed above, published documents can be stored separately from the document metadata. In some embodiments, a published document may include all or part of the document metadata. In general, the published document includes at least enough metadata that enables ADF-DI client component 240 to initialize the document and request additional information from ADF-DI server component 270 to render the contents of document 250 for the user at runtime. FIG. 3 ends in step 350.

During runtime, a user downloads published document 250 and opens it with application 230. In one embodiment, ADF-DI client component 240 has been installed as an application plugin or module. ADF-DI client component 240 can then detect that document 250 has been authored to include framework components and contacts ADF-DI server component 270 to request document metadata, actual data, and any logic that needs to be performed. For example, ADF-DI client component 240 may first retrieve from or through from ADF-DI server component 270 document metadata defining which components are to be included and where to include them. ADF-DI client component 240 may retrieve from or through from ADF-DI server component 270 data from ADF model 280 for which selected components will use or otherwise operate on. ADF-DI client component 240 may further retrieve from or through from ADF-DI server component 270 any logic associated with document 250. Finally, ADF-DI client component 240 may then render contents of document 250 utilizing the document metadata, actual data, and logic.

Accordingly, a user may retrieve a document template and have the document content automatically updated and formatted based on processing performed by ADF-DI client component 240 and data obtained from application server 260. The users can then avail themselves of the familiar user interface associated with application 230 to undertake tasks using document 250.

In various aspect, as the user interacts with or manipulates document 250, ADF-DI client component 240 and ADF-DI server component 270 may remain in communication to send and receive updates accordingly. Changes made within one or more components of document 250 to data of a corresponding model in model layer 130 may be persisted in ADF model 280.

Figure 4:
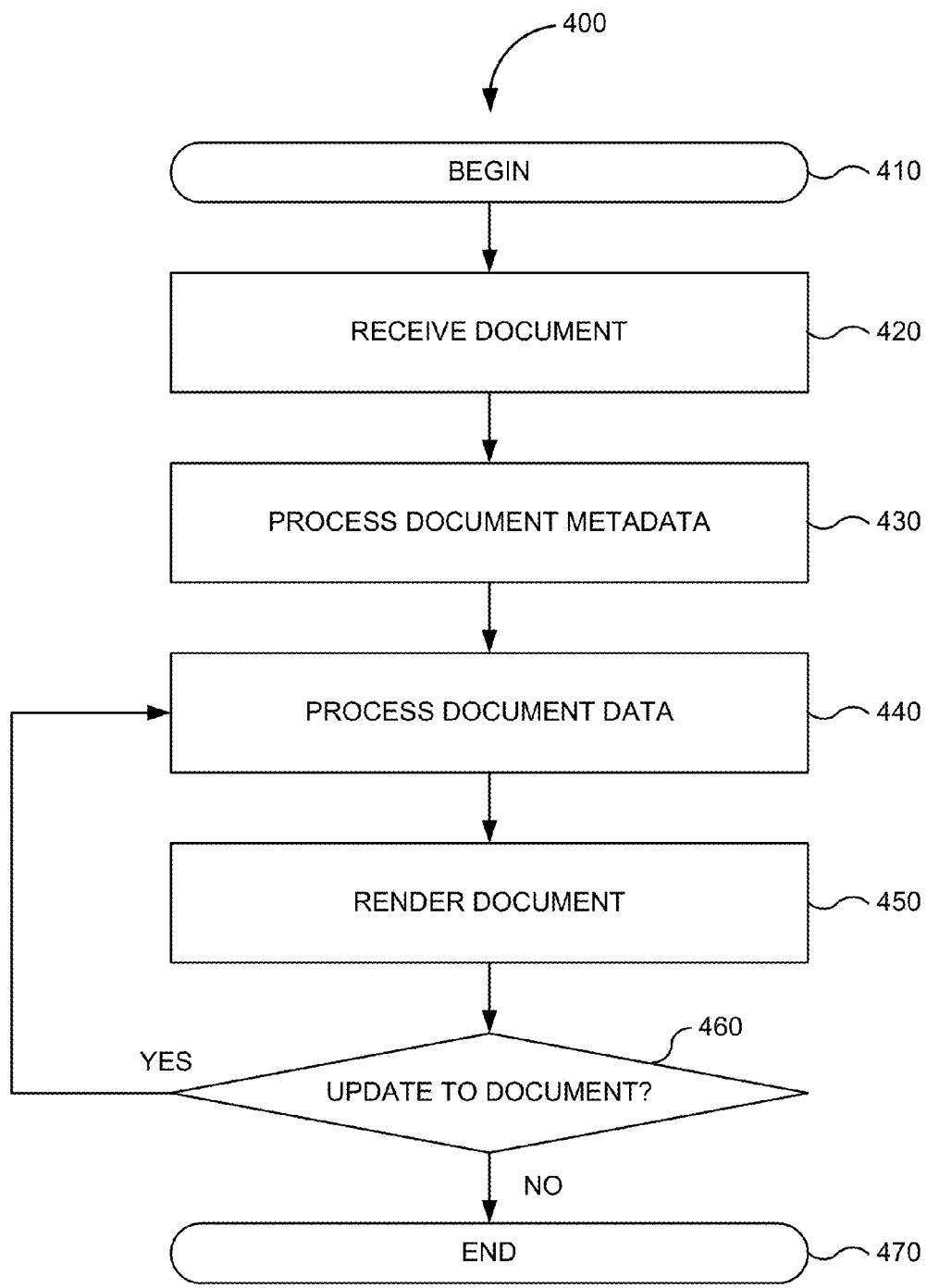
FIG. 4 is a flowchart of a method for interacting with a document using the desktop integration framework of FIG. 2 in one embodiment according to the present invention.

FIG. 4 is a flowchart of method 400 for interacting with a document using desktop integration framework 200 of FIG. 2 in one embodiment according to the present invention. Implementations or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, a document is received. According to FIG. 2, a user can interact with application server 260 to retrieve a desired document, such as by clicking a document link. The document may be downloaded or otherwise communicated to client computer system 210 and opened in application 230.

In step 430, document metadata is processed. As discussed above, the document metadata includes information utilized by ADF-DI client component 240 to render contents of the document based on data obtained from application server 260. Accordingly, ADF-DI client component 240 determines which components are to be added to the document and where. ADF-DI client component 240 further determines what data is used by each component as well as applies any logic defined by a developer.

In step 440, document data is processed. As discussed above, published documents can be stored separately from the document metadata and the actual data used by the document. In general, the published document includes at least enough metadata that enables ADF-DI client component 240 to initialize the document and request additional information from ADF-DI server component 270 to render the contents of document 250 for the user.

In step 450, the document is rendered. As discussed above, ADF-DI client component 240 may retrieve from or through from ADF-DI server component 270 data from ADF model 280 for which selected components will use or otherwise operate on. ADF-DI client component 240 may further retrieve from or through from ADF-DI server component 270 any logic associated with document 250. Finally, ADF-DI client component 240 may then render contents of document 250 utilizing the document metadata, actual data, and logic.

In step 460, a determination is made whether an update to the document exists. There may be a variety of reasons why an update to the document may exist. As a user interacts with or manipulates document 250, ADF-DI client component 240 and ADF-DI server component 270 may remain in communication to send and receive updates accordingly. Changes made within one or more components of document 250 to data of a corresponding model in model layer 130 may be persisted in ADF model 280. In some embodiments, an interaction by a user may require a new dataset. As such, the flow of method 400 returns to step 440 to process the additional document data that is rendered in step 450. FIG. 4 ends in step 470.

Model-Driven Aspect

In various embodiments, desktop integration framework 200 allows a developer to include components document 250 whose view and data are driven by corresponding models or model attributes. In one aspect, a component may provide a tool tip that includes useful information about the rendered content of a component that is displayed when a user's mouse is over a portion of data or when data is selected. The tool tip may be defined via a model or object and automatically configured when components of the document are rendered. In another aspect, elements of a list component may be populated with preexisting values of one or more attributes associated with a model or object. Accordingly, a developer is not required to specify the values in a view that the component presents when the document is rendered.

Figure 5:
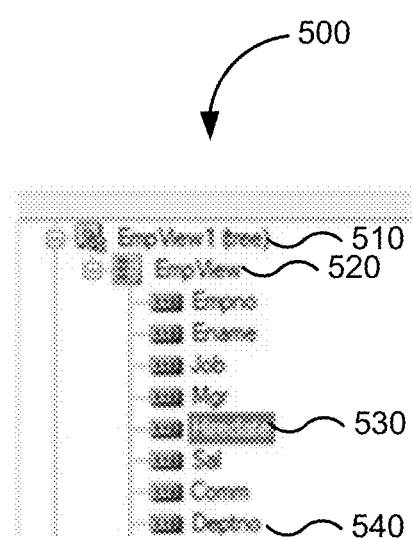
FIG. 5 is an illustration of a screenshot of document components whose views may be driven by underlying data models in one embodiment according to the present invention.

FIG. 5 is an illustration of screenshot 500 of document components whose views may be driven by underlying data models in one embodiment according to the present invention. In this example, tree 510 provides a listing of one or more views that may be presented in document 250. In the example, EmpView 520 includes one or more components, such as text, list, image, date, and the like labeled "Empno", "Ename", "Job", "Mgr", etc.

In one aspect, an underlying data model or attribute of an employee object associated with component 530 is labeled "Hiredate." The data model or attribute is configured to store a date value associated with the date that a given employee was hired by an organization. In various embodiments, the view or behavior of component 530 may be driven by the fact that the attribute stores a date value absent further configuration by a developer. For example, at the time that ADF-DI client component 240 renders an Excel workbook having a cell corresponding to component 530, ADF-DI client component 240 may configure the cell such that when a user selects the cell that stores a value representing the date of the employees hire, a date popup is provided within or outside of the native features of Excel allowing the user to select a new date of hire or modify an existing date of hire.

In another aspect, an underlying data model or attribute of an employee object associated with component 540 is labeled "Deptno." The data model or attribute is configured to store an identifier for a department or team associated with an employee. In various embodiments, the view or behavior of component 540 may be driven by the fact that the attribute stores one of a plurality of predetermined values specified in the data model absent further configuration by a developer. For example, at the time that ADF-DI client component 240 renders an Excel workbook having a cell corresponding to component 540, ADF-DI client component 240 may configure the cell such that when a user selects the cell that stores a value representing the department or team to which the employee is assigned, a drop down list is provided within or outside of the native features of Excel allowing the user to select from a predetermined list of departments or teams derived from the data model.

Figure 6:
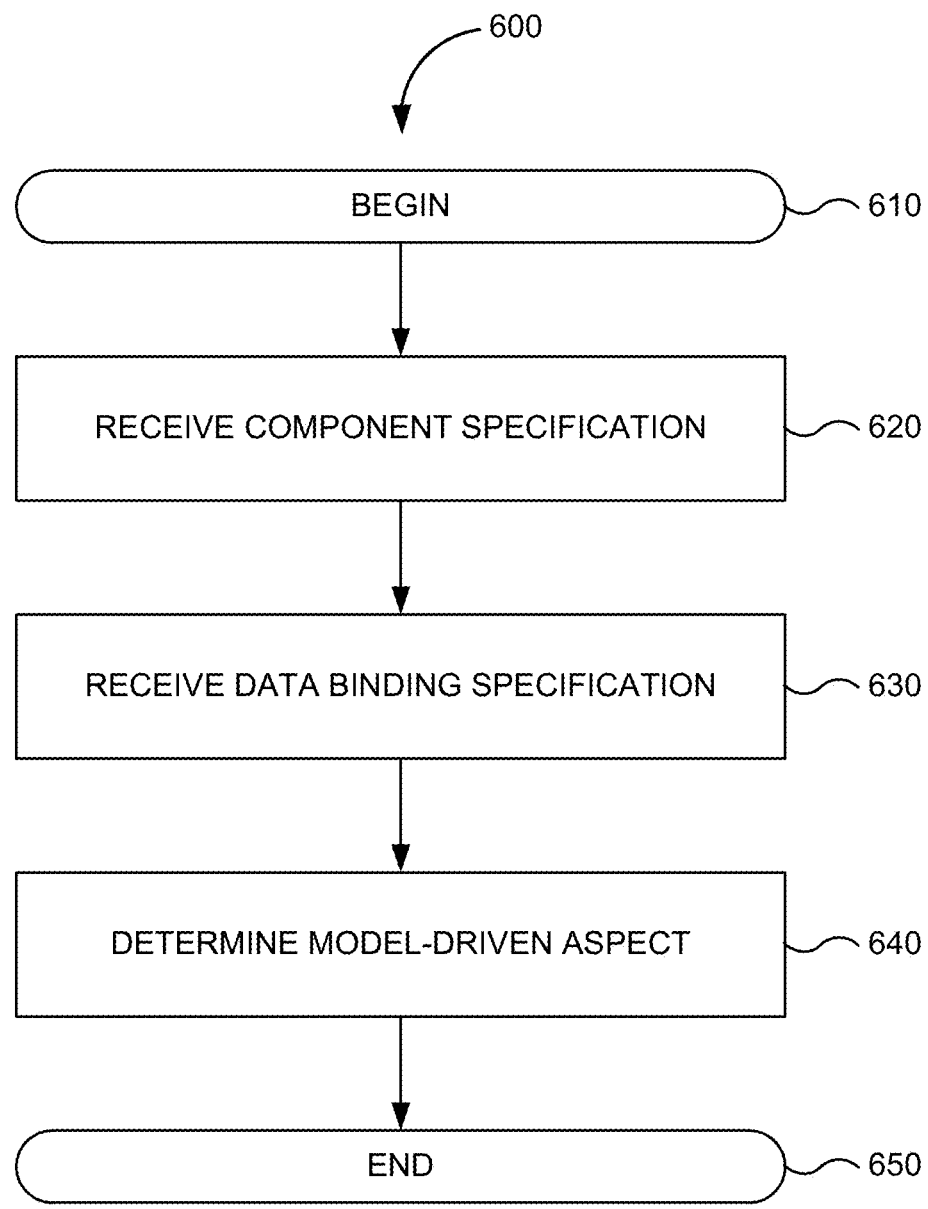
FIG. 6 is a flowchart of a method for designing a model-driven aspect of a component using the desktop integration framework of FIG. 2 in one embodiment according to the present invention.

FIG. 6 is a flowchart of method 600 for designing a model-driven aspect of a component using desktop integration framework 200 of FIG. 2 in one embodiment according to the present invention. Implementations or processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 begins in step 610.

In step 620, a component specification is received. In general, a component specification refers to information that specifies how the component is defined. According to FIG. 2, a developer can open an existing document or create a new document in application 230, such as creating a new spreadsheet in Microsoft Excel. The developer then may edit, structure, or format the document in any desired manner using native and non-native tools. Additionally, the developer may select from a plurality of predetermined components and add those components to document 250.

In step 630, a data binding specification is received. In general, a data binding specification refers to information that specifies how the component interacts with data, such as its source and the like. In various embodiments, ADF-DI client component 240 utilizes this information to further configure the component in addition to the component specification. In one aspect, ADF-DI client component 240 identifies how each component will present one or more views based on one or more models or objects associated with the component. ADF-DI client component 240 may interact with ADF-DI Server component 270 to retrieve model aspects, values, and the like to configure the component, any associated views, as well as associated behaviors. In various embodiments, ADF-DI client component 240 may receive a component specification and data binding specification in response to a user using the expression builder discussed above.

In step 640, a model-driven aspect of the component is determined. ADF-DI client component 240 may interact with ADF-DI Server component 270 to retrieve model aspects, values, and the like know as attribute properties or hints in ADF model 280 to configure the component, any associated views, as well as associated behaviors. The configuration information may be stored in the document metadata that may be associated with a published document.

In one example, a label that is presented to a user is often different than the name of a data object corresponding to the label. For example, if an attribute called "EmpName" exists but in the UI, a developer desires to display "Employee Name." Most UI frameworks allow the developer to specify a user-friendly label. However, it is not efficient to specify the user-friendly label in each place it needs to appear. The "model-driven" approach is to associate the user-friendly label with the EmpName attribute at the model level. Then, each UI element (page, worksheet, etc) that wants to render EmpName will "refer" to EmpName's label indirectly at design-time and fetch it dynamically at runtime. The approach applies to various different potential properties of a data object. Other examples include "read-only", "mandatory", etc. FIG. 6 ends in step 650.

Metadata Management

Figure 7:
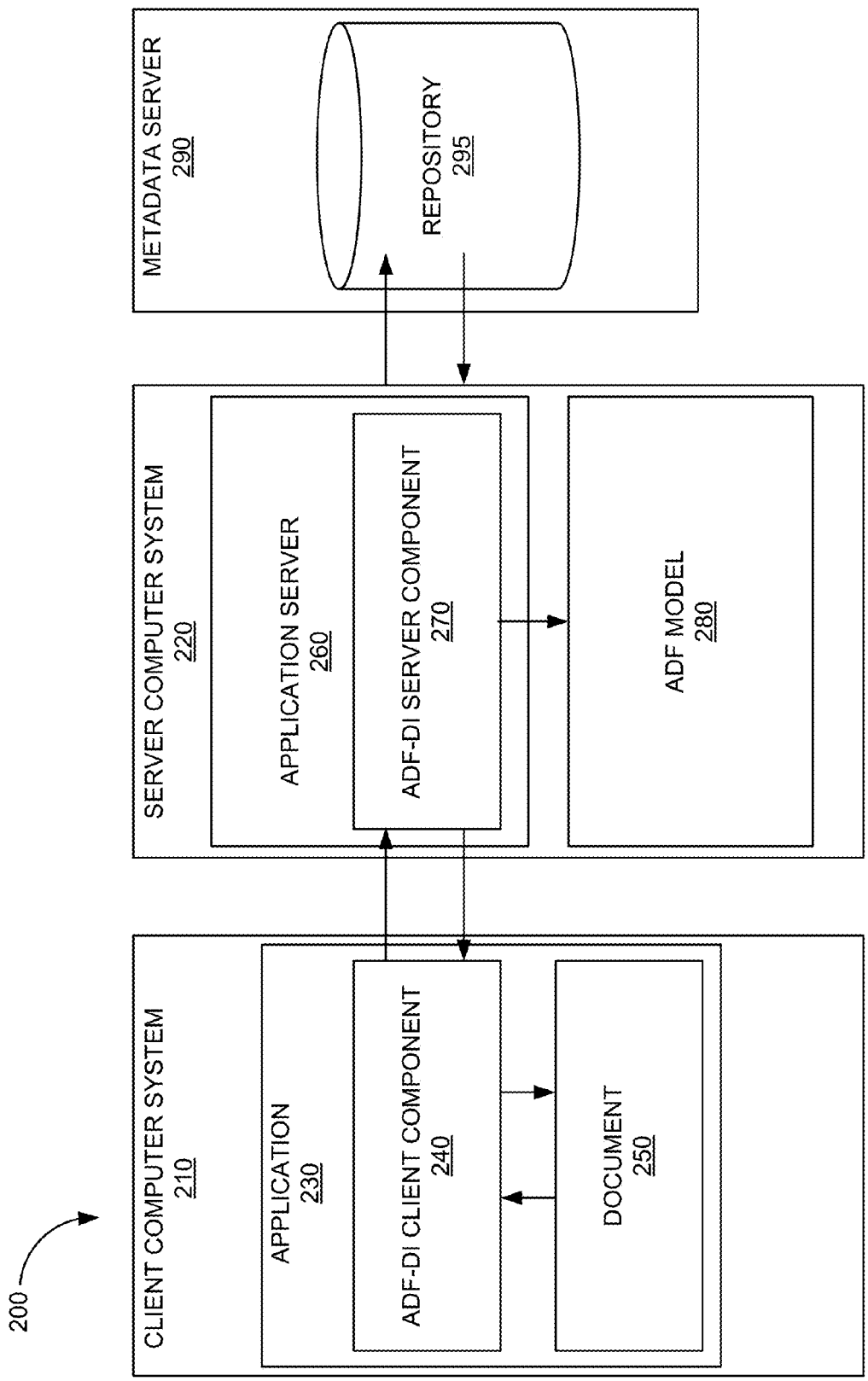
FIG. 7 is a block diagram illustrating the desktop integration framework for ADF of FIG. 2 providing metadata management in one embodiment according to the present invention.

In some embodiments, metadata that defines a workbook integration can be managed by a metadata service. FIG. 7 is a block diagram illustrating interactions in desktop integration framework 200 of FIG. 2 providing metadata management in one embodiment according to the present invention. In this example, document metadata can be stored inside repository 295 both at design-time and at runtime. In repository 295, the metadata can be customized after document 250 has been published, such as at a customer site. ADF-DI server component 270 communicates with metadata server 290 to provide one or more versions of the document metadata based on a set of management rules. The management rules may define criteria and/or conditions that dictate what version of metadata a document utilizes, such as time, date, user role, organization, etc. This allows the workbook definition schema to change over time, such as when more features are added.

Accordingly, in various embodiments, desktop integration framework 200 allows a developer to designate a workbook as customizable. The developer can configure workbook metadata to be retrieved from metadata server 290 at well-defined workbook initialization points. Workbook metadata can be customized for the current user's customization context. In another aspect, the runtime workbook can be rendered using customized metadata retrieved from metadata server 290.

In various embodiments, ADF-DI client component 240 forwards the document metadata to ADF-DI server component 270 which in turn has metadata server 290 store workbook definition files (base document metadata) and customizations. Developers may choose to use file-based or database repository for managing the base document and/or customizations.

Figure 8:
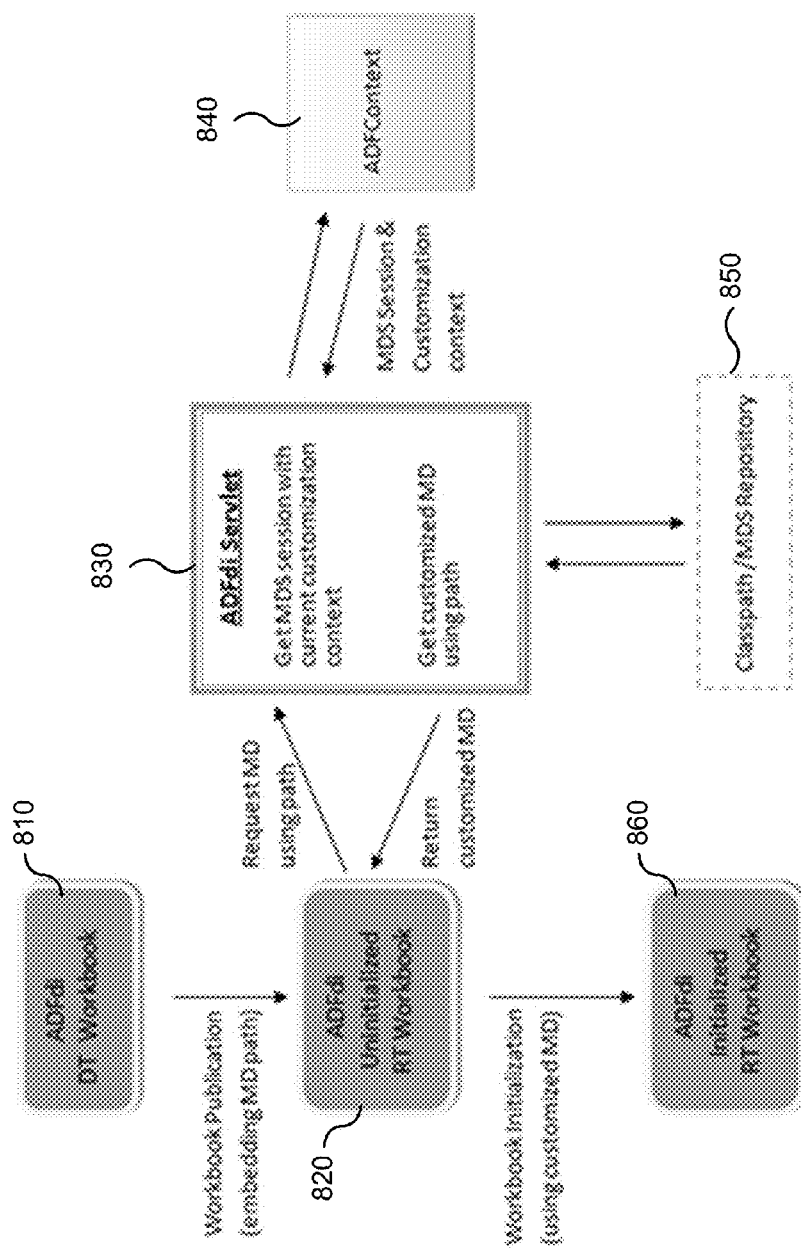
FIG. 8 is a block diagram illustrating interactions between the desktop integration framework of FIG. 2 to provide metadata management in one embodiment according to the present invention.

FIG. 8 is a block diagram illustrating interactions between the desktop integration framework of FIG. 7 to provide metadata management in one embodiment according to the present invention. In block 810, a customization-enabled workbook is published in such a way that an inferred metadata path can be used to locate a corresponding workbook definition file on the classpath. For example, given a design-time workbook: "/PROJECT_ROOT/src/apps/workbooks/myDTWorkbook.xlsx", when it is published, its workbook definition file is generated at: "/PROJECT_ROOT/src/apps/workbooks/myDTWorkbook.xlsx-workbook-definition.xml". When the application is deployed, this workbook definition file can be found by the classpath repository using path "/apps/workbooks/myDTWorkbook.xlsx-workbook-definition.xml". So, in order that the runtime workbook can load its workbook metadata using the inferred metadata path, it should be published to the "/PROJECT_ROOT/public_html/oracle/apps/workbooks/" folder. As discussed above, developers may choose to use file-based or database repository for managing the base document and/or customizations.

On workbook initialization in block 820, ADF-DI client component 240 issues a request to server computer system 220 for the metadata of current workbook. In block 830, ADF-DI server component 270 retrieves workbook metadata using an MDS session (e.g., a standard MDS session via metadata server 290 from the current ADFContext). Based on a customization context associated with the MDS session, metadata server 290 applies any and all customizations to the workbook metadata. The customized workbook metadata is returned to ADF-DI client component 240 in block 820 and written into the workbook's metadata cache. In block 860, the cached customized workbook metadata is used to initialize the run-time workbook.

Figure 9:
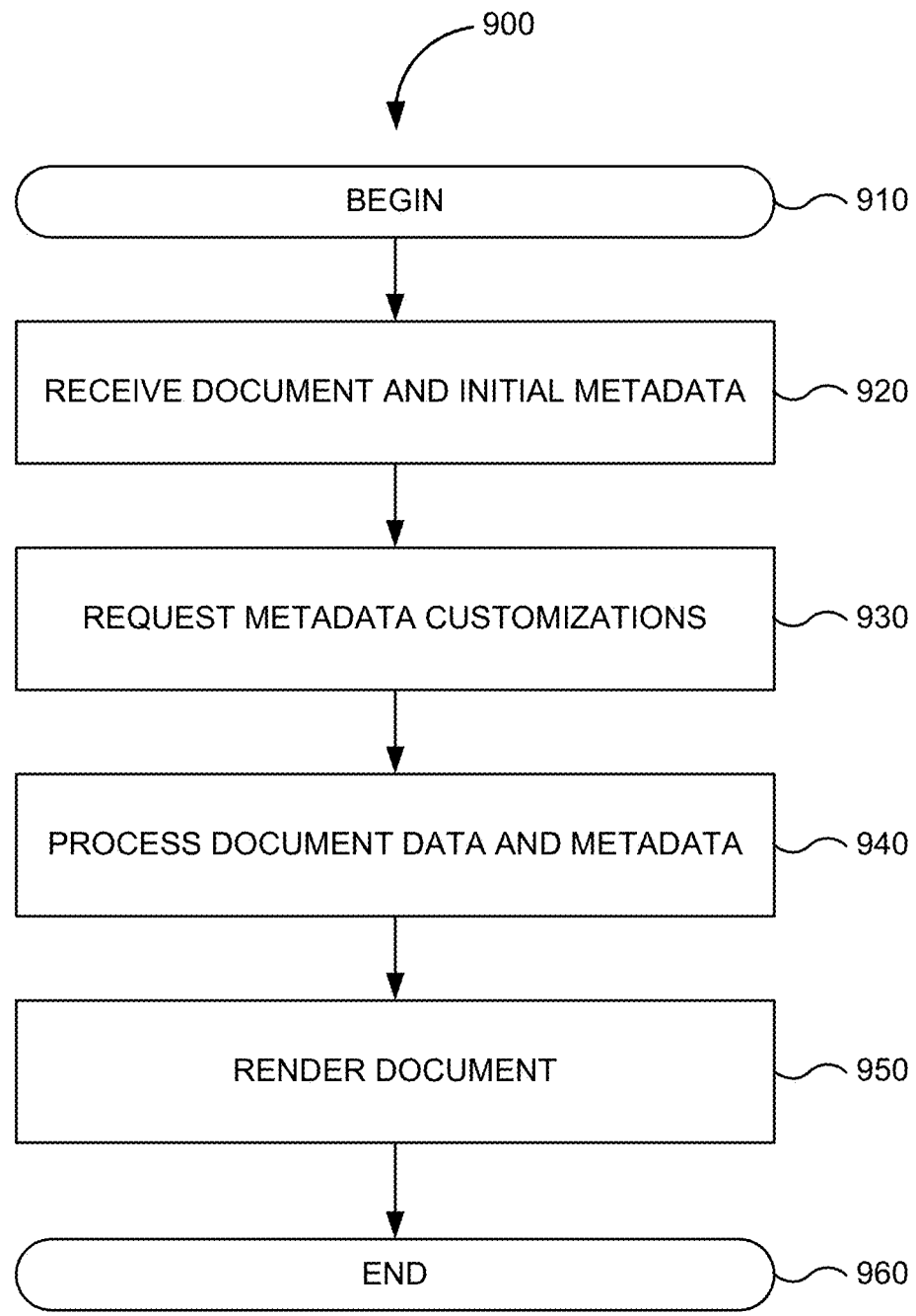
FIG. 9 is a flowchart of a method for running a document using the desktop integration framework of FIG. 2 with metadata management in one embodiment according to the present invention.

FIG. 9 is a flowchart of method 900 for running a document using desktop integration framework 200 of FIG. 2 that includes one or more customizations in one embodiment according to the present invention. Implementations or processing in method 900 depicted in FIG. 9 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 900 depicted in FIG. 900 begins in step 910.

In step 920, a document and initial metadata is received. For example, a user may request to download published document 250 from application server 260. In step 930, metadata customizations are requested. In one aspect, a document download may complete with document 250 at which time document 250 can be opened with application 230. ADF-DI client component 240 may then detect that document 250 needs to be rendered. ADF-DI client component 240 contacts ADF-DI server component 270 and obtains the document metadata and any actual data to be rendered according to the design of the document.

In various aspects, on workbook initialization, ADF-DI client component 240 issues a request to server computer system 220 for the metadata of current workbook. ADF-DI server component 270 obtains a standard MDS session via metadata server 290 from current ADFContext and retrieves the workbook metadata using this MDS session. Based on the customization context associated with the MDS session, metadata server 290 applies any and all customizations to the workbook metadata. The customized workbook metadata is returned to ADF-DI client component 240. The customized workbook metadata is used to initialize the run-time workbook.

In step 940, the document and customized metadata is processed. ADF-DI client component 240 determines the placement of components and renders them as the contents of document 250 utilizing the actual data provided by ADF-DI server component 270 in step 950. FIG. 9 ends in step 960.

Workbook Composer

In various embodiments, customizations can be made utilizing a variety of tools and interfaces. Methods, systems, and non-transitory computer-readable media are disclosed that allow end users to provide runtime customizations of documents developed using a desktop integration framework. Workbook metadata is a set of information that describes how a given workbook is integrated with a particular web application. When a workbook is being published, metadata may be written into a local cache in the published workbook as well as a workbook definition file. Metadata management may be handled by a metadata service allowing updates and customization of published workbooks independently of the local cache in the published workbook and the workbook definition file. A workbook customization editor is used to perform various customizations of integrated workbooks.

Figure 10:
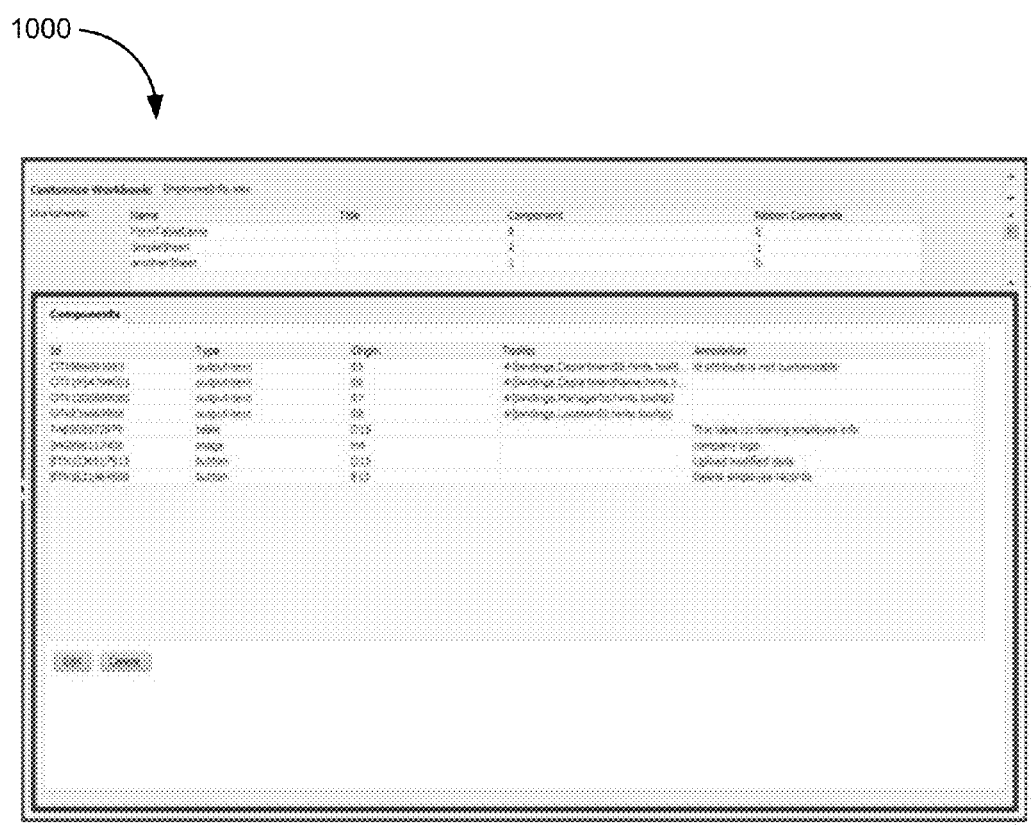
FIG. 10 is a screenshot of a user interface for customizing metadata in one embodiment according to the present invention.

FIG. 10 is a screenshot of user interface 1000 for customizing metadata in one embodiment according to the present invention. In this example, user interface 1000 provides the ability to select an integrated worksheet from a given workbook, the ability to view and select components on the selected worksheet, or the ability to edit or delete the selected component. In some embodiments, user interface 1000 may provide the ability to add new worksheets, the ability to add new components, or the ability to edit advanced properties of existing components, such as action sets.

In one example of operation, a web application has shipped and is installed at Acme Corp. A business analyst for Acme, Ralph, reviews the integrated workbooks and determines that some adjustments are needed. Ralph logs into the web application and navigates to user interface 1000. Ralph decides to create a new customization of the base workbook. Ralph removes 5 columns from the standard 65 columns in the table since he knows that Acme does not need/want those columns. Ralph saves the customization. The customization is now available for users that match the customization context associated with the workbook customization. Such users will see a table with 60 columns.

In another example, user interface 1000 forms part of an ADF Task Flow that allows an authorized user to edit various aspects of a given integrated workbook. As discussed above, user interface 1000 may provide a list of integrated worksheets from the selected workbook. User interface 1000 may include functionality that enables a user to select or delete workbooks and/or worksheets. User interface 1000 may include a list of components that appear or are otherwise associated with a selected worksheet. User interface 1000 may include functionality that enables a user to select, delete, and edit components. User interface 1000 may include functionality that enables a user to edit properties of components, such as Input-Text, Output-Text, Label, List-of-Values. For example, a developer of document 250 may specify what aspects of a component are viewable (view only), such as component ID, Value, Annotation, etc., or editable such as Style, Tooltip, ReadOnly, Position. The developer may specify what aspects of a component are editable, such as for an image component—Source, ShortDesc, Position, etc., for a button component—Label, Position, etc. In another aspect, the developer may specify what aspects of a table component are viewable (view only) and editable. Some examples include a read-only table—delete component only, not editable; or to allow editing of Position, Columns (whether to delete, edit, re-order), editing of Cell/Header styles, Tooltip, Visible, header label, and to prevent deletion of special columns.

In various aspects, a host application provides user interface 1000 various pieces of information, such as the workbook to be edited (including the metadata path and the workbook name) and a customization context. Additionally, the host application may be responsible for controlling which users of user interface 1000 may edit which (if any) workbooks.

Conclusion

Systems depicted in some of the figures may be provided in various configurations. In some embodiments, the systems may be configured as a distributed system where one or more components of the system are distributed across one or more networks in a cloud computing system.

Figure 11:
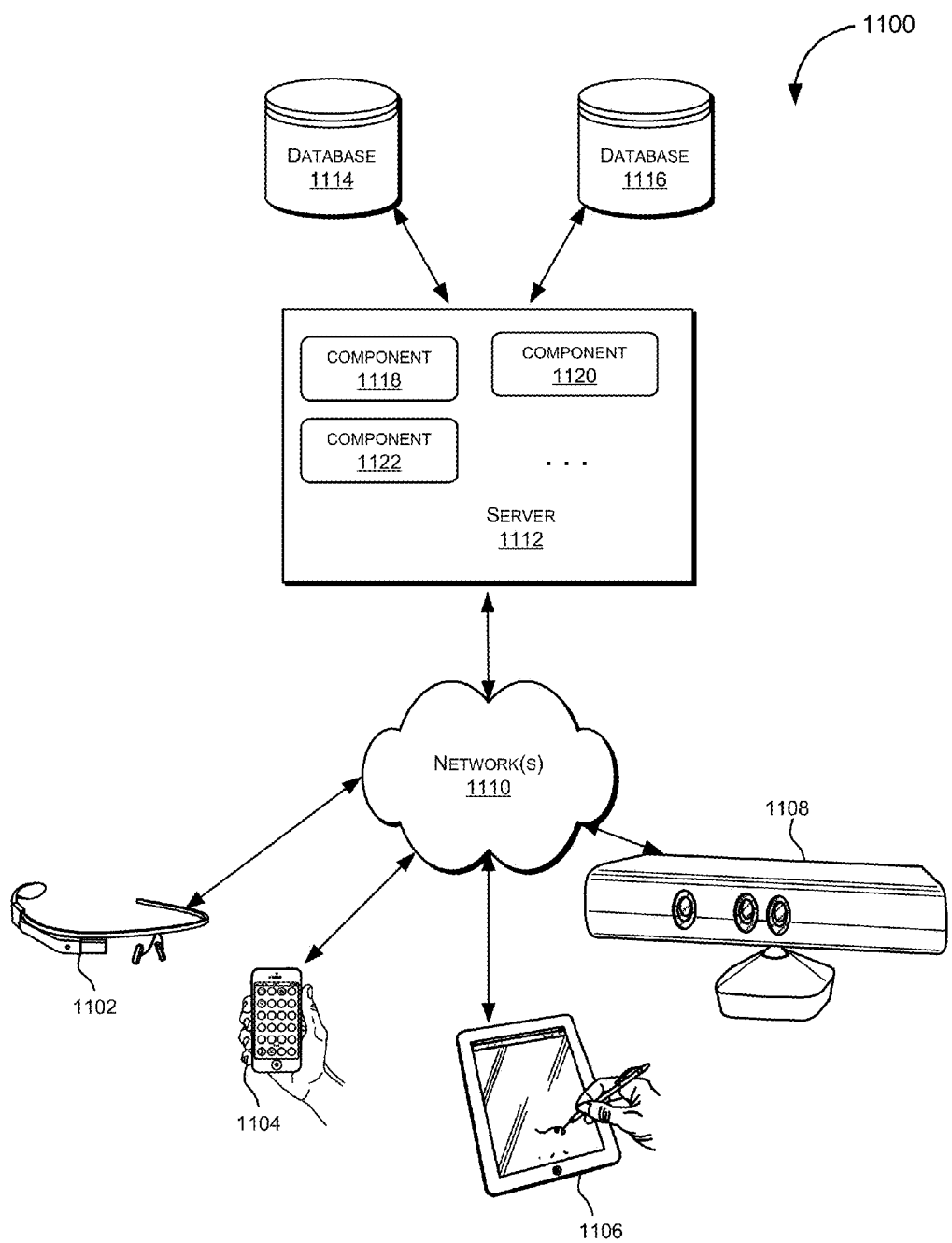
FIG. 11 depicts a simplified diagram of a distributed system for implementing one of the embodiments.

FIG. 11 depicts a simplified diagram of a distributed system 1100 for implementing one of the embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications provided by one or more of the components of the system. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in the figure is thus one example of a distributed system for implementing an embodiment system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

Figure 12:
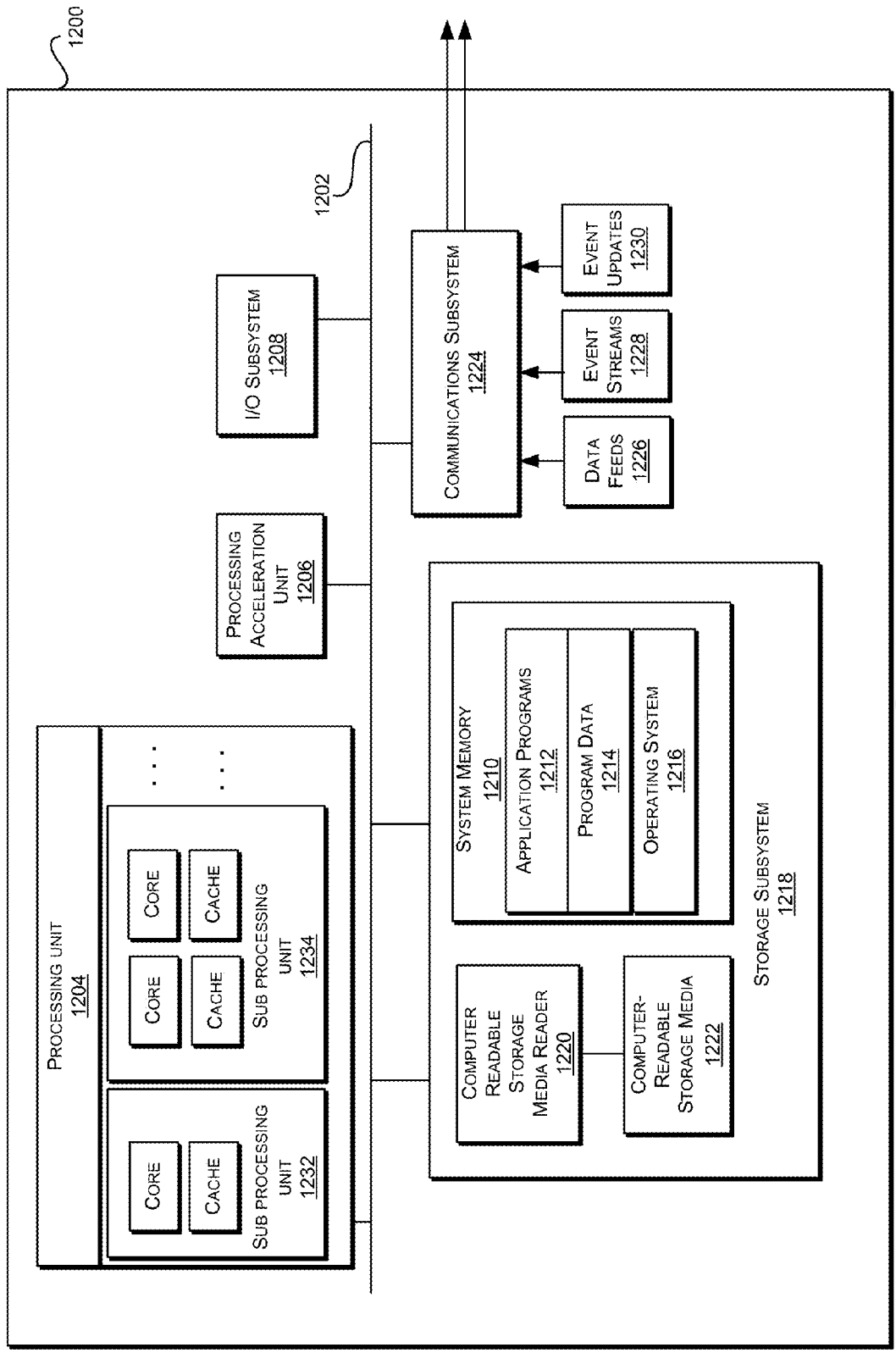
FIG. 12 illustrates an exemplary computer system, in which various embodiments of the present invention may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method comprising:
receiving, at a computer system, information identifying a document whose contents are native to a native application,
wherein the native application includes or is in communication with an application development framework (ADF) through a plugin of the native application,
wherein the document comprises one or more components of the ADF that are an element of the document that represent data associated with data models of a web application,
wherein the native application is a desktop application that acts as a user interface for the web application,
wherein the one or more components are linked with the data associated with the data models to integrate the document with the web application, wherein the web application is hosted by the computing system and is in communication with: (1) a model layer developed via the ADF and (2) the plugin of the native application;

receiving, at the computer system, metadata associated with the document, wherein the metadata includes information regarding the link between the one or more components and the data associated with the data models of the web application such that the plugin can use the information to render the one or more components of the document with the data associated with the data models;

generating, by the computer system, a first user interface of the web application having functionality that enables a user to customize the metadata for a customization context of one or more users;

receiving, via the first user interface of the web application, customized metadata for the customization context of the one or more users; and storing the customized metadata provided via the first user interface in a storage device that is in communication with the computing system such that a request to render the document using the metadata includes:

obtaining a metadata service session with the storage device based on an application development framework context, wherein the application development framework context represents a current context of the one or more users;

identifying the customization context of the one or more of the users based on the application development framework context associated with the metadata service session;

retrieving the customized metadata using the metadata service session based on the identified customization context of the one or more users;

incorporating the customized metadata into the document via the plugin of the native application; and rendering the document using the plugin of the native application based on the customized metadata, wherein the rendering the document comprises rendering the one or more components by incorporating the data associated with data models of the web application, wherein the one or more components are rendered using the customized metadata such that the one or more components include one or more custom modifications of the data, and wherein the document is configured to act as a second user interface for the web application by extending functionality provided by the web application to the native application, and the second user interface comprises the one or more components with the one or more custom modifications.

2. The method of claim 1, wherein generating, by the computer system, the first user interface having functionality that enables users of the first user interface to customize the metadata comprises generating functionality that enables the users of the first user interface to customize one or more components of a published document.

3. The method of claim 1, wherein generating, by the computer system, the first user interface having functionality that enables users of the first user interface to customize the metadata comprises generating functionality that enables the users of the first user interface to add one or more components to a published document.

4. The method of claim 1, wherein generating, by the computer system, the first user interface having functionality that enables users of the first user interface to customize the metadata comprises generating functionality that enables the users of the first user interface to remove one or more components from a published document.

5. The method of claim 1, wherein generating, by the computer system, the first user interface having functionality that enables users of the first user interface to customize the metadata comprises generating functionality that enables the users of the first user interface to customize contents of a published document.

6. The method of claim 1, wherein generating, by the computer system, the first user interface having functionality that enables users of the first user interface to customize the metadata comprises generating functionality that enables the users of the first user interface to customize one or more properties of a published document.

7. A non-transitory computer-readable medium storing computer-executable code, the non-transitory computer-readable medium comprising:

code for receiving information identifying a document whose contents are native to a native application, wherein the native application includes or is in communication with an application development framework (ADF) through a plugin of the native application, wherein the document comprises one or more components of the ADF that are an element of the document that represent data associated with data models of a web application, wherein the native application is a desktop application that acts as a user interface for the web application, wherein the one or more components are linked with the data associated with the data models to integrate the document with the web application, and wherein the web application is hosted by a computing system and in communication with: (1) a model layer developed via the ADF and (2) the plugin of the native application;

code for receiving metadata associated with the document, wherein the metadata includes information regarding the link between the one or more components and the data associated with the data models of the web application such that the plugin can use the information to render the one or more components of the document with the data associated with the data models;

code for generating a first user interface of the web application having functionality that enables a user to customize the metadata for a customization context of one or more users;

code for receiving, via the first user interface of the web application, a customized metadata for the customization context of the one or more users; and code for storing the customized metadata provided via the first user interface in a storage device that is in communication with the computing system such that a request to render the document using the metadata includes:

obtaining a metadata service session from the storage device based on an application development framework context, wherein the application development framework context represents a current context of the one or more users;

identifying the customization context of the one or more of the users based on the application development framework context associated with the metadata service session;

retrieving the customized metadata using the metadata service session based on the identified customization context of the one or more users;

incorporating the customized metadata into the document via the plugin of the native application; and rendering the document using the plug in of the native application based on the customized metadata, wherein the rendering the document comprises rendering the one or more components by incorporating the data associated with data models of the web application, wherein the one or more components are rendered using the customized metadata such that the one or more components include one or more custom modifications of the data, and wherein the document is configured to act as a second user interface for the web application by extending functionality provided by the web application to the native application, and the second user interface comprises the one or more components with the one or more custom modifications.

8. The non-transitory computer-readable medium of claim 7, wherein the code for generating the user interface having functionality that enables users of the user interface to customize the metadata comprises code for generating functionality that enables the users of the user interface to customize one or more components of a published document.

9. The non-transitory computer-readable medium of claim 7, wherein the code for generating the first user interface having functionality that enables users of the first user interface to customize the metadata comprises code for generating functionality that enables the users of the first user interface to add one or more components to a published document.

10. The non-transitory computer-readable medium of claim 7, wherein the code for generating the first user interface having functionality that enables users of the first user interface to customize the metadata comprises code for generating functionality that enables the users of the first user interface to remove one or more components from a published document.

11. The non-transitory computer-readable medium of claim 7, wherein the code for generating the first user interface having functionality that enables users of the first user interface to customize the metadata comprises code for generating functionality that enables the users of the first user interface to customize contents of a published document.

12. The non-transitory computer-readable medium of claim 7, wherein the code for generating the first user interface having functionality that enables users of the first user interface to customize the metadata comprises code for generating functionality that enables the users of the first user interface to customize one or more properties of a published document.

13. A system comprising:

a processor; and a memory configured to store a set of instructions which when execute by the processor configure the processor to:

receive information identifying a document whose contents are native to a native application, wherein the native application includes or is in communication with an application development framework (ADF) through a plugin of the native application, wherein the document comprises one or more components of the ADF that are an element of the document that represent data associated with data models of a web application, wherein the native application is a desktop application that acts as a user interface for the web application, wherein the one or more components are linked with the data associated with the data models to integrate the document with the web application, and wherein the web application is hosted by the computing system and in communication with: (1) a model layer developed via the ADF and (2) the plugin of the native application;

receive metadata associated with the document wherein the metadata includes information regarding the link between the one or more components and the data associated with the data models of the web application such that the plugin can use the information to render the one or more components of the document with the data associated with the data models;

generate a first user interface having functionality that enables a user to customize the metadata for a customization context of one or more users;

receive, via the first user interface of the web application, a customized metadata for the customization context of the one or more users; and store the customized metadata provided via the first user interface in a storage device that is in communication with the computing system such that a request to render the document using the metadata includes:

obtaining a metadata service session from the storage device based on an application development framework context, wherein the application development framework context represents a current context of the one or more users;

identifying the customization context of the one or more of the users based on the application development framework context associated with the metadata service session;

retrieving the customized metadata using the metadata service session based on the identified customization context of the one or more users;

incorporating the customized metadata into the document via the plugin of the native application; and rendering the document via the plugin of the native application based on the customized metadata, wherein the rendering the document comprises rendering the one or more components by incorporating the data associated with data models of the web application, wherein the one or more components are rendered using the customized metadata such that the one or more components include one or more custom modifications of the data, and wherein the document is configured to act as a second user interface for the web application by extending functionality provided by the web application to the native application, and the second user interface comprises the one or more components with the one or more custom modifications.

14. The system of claim 13, wherein to generate the first user interface having functionality that enables users of the first user interface to customize the metadata the processor is configured to generate functionality that enables the users of the first user interface to customize one or more components of a published document.

15. The system of claim 13, wherein to generate the first user interface having functionality that enables users of the first user interface to customize the metadata the processor is configured to generate functionality that enables the users of the first user interface to add one or more components to a published document.

16. The system of claim 13, wherein to generate the first user interface having functionality that enables users of the first user interface to customize the metadata the processor is configured to generate functionality that enables the users of the first user interface to remove one or more components from a published document.

17. The system of claim 13, wherein to generate the first user interface having functionality that enables users of the first user interface to customize the metadata the processor is configured to generate functionality that enables the users of the first user interface to customize contents of a published document.

18. The system of claim 13, wherein to generate the first user interface having functionality that enables users of the first user interface to customize the metadata the processor is configured to generate functionality that enables the users of the first user interface to customize one or more properties of a published document.

\* \* \* \* \*

UNITED STATES PATENT AND TRADEMARK OFFICE
CERTIFICATE OF CORRECTION

| | |
|---|---|
| PATENT NO. | : 9,916,157 B2 |
| APPLICATION NO. | : 14/304393 |
| DATED | : March 13, 2018 |
| INVENTOR(S) | : Geng et al. |

Page 1 of 1

It is certified that error appears in the above-identified patent and that said Letters Patent is hereby corrected as shown below:

In the Specification

In Column 10, Line 42, delete "may e" and insert -- may be --, therefor.

In the Claims

In Column 27, Line 3, in Claim 7, delete "plug in" and insert -- plugin --, therefor.

Signed and Sealed this
Twenty-ninth Day of December, 2020

Andrei Iancu
*Director of the United States Patent and Trademark Office*